(No Model.)
H. B. SHERWOOD.
Tool Handle.
No. 237,056.            Patented Jan. 25, 1881.
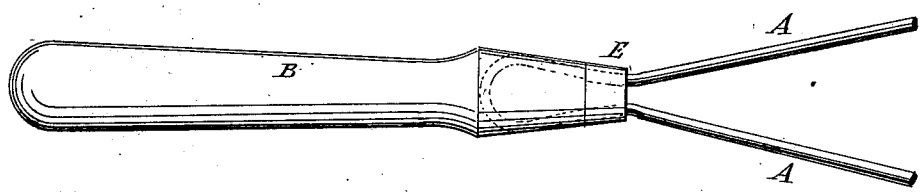
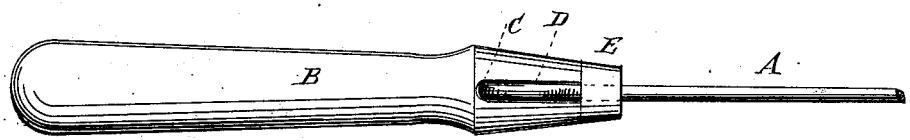
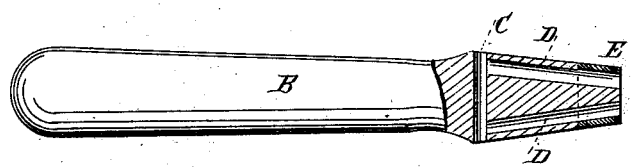 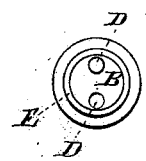

UNITED STATES PATENT OFFICE.

HENRY B. SHERWOOD, OF WESTPORT, CONNECTICUT.

TOOL-HANDLE.

SPECIFICATION forming part of Letters Patent No. 237,056, dated January 25, 1881.

Application filed August 19, 1880. (No model.)

*To all whom it may concern:*

Be it known that I, HENRY B. SHERWOOD, of Westport, in the county of Fairfield and State of Connecticut, have invented a new and useful Improvement in Tool-Handles and in the Mode of Attaching Shanks Thereto, of which the following is a specification.

Figure 1 is a plan view of the improvement. Fig. 2 is a side view. Fig. 3 is a sectional plan view of the handle. Fig. 4 is an end view of the handle.

Similar letters of reference indicate corresponding parts.

The object of this invention is to furnish handles and shanks for hand-weeders, curry-combs, and various other tools, so constructed as to be firm, strong, and durable.

A represents the shank, and B the handle, of a weeder or other tool.

The handle B is made of the ordinary shape and size, and through it, near its forward end, is bored a transverse aperture, C. In the sides of the forward end of the handle A are bored holes, leading from the said forward end along the sides of the handle to the ends of the hole C, forming channels or grooves D. Upon the forward end of the handle B is placed a ferrule, E, which should be put on before the channels or grooves D are bored, to guard against splitting, and which is taken off when the shank A is to be applied.

The shank A is made of a piece of wire of suitable length and size, reference being had to the purpose for which the tool is to be used. The wire for the shank A is passed through the aperture C until its ends project at equal distances upon the opposite sides of the handle B. The ends of the wire are then brought together, bringing its arms into the grooves D, and the ferrule E is slipped on over the said ends and driven into place upon the end of the handle B. The ends of the wire A are then bent outward, so as to incline from each other, as shown in Fig. 1, and may be secured to the tool by riveting, or in any other suitable manner. With this construction the connection between the shank A and handle B is not liable to become loose or to come apart.

Having thus described my invention, what I claim as new, and desire to secure by Letters Patent, is—

A handle, B, having the longitudinal grooves D converging toward the end, and a cross-hole, C, connected therewith, in combination with the end ferrule, E, to hold a wire passed through said cross-hole, and bent into said grooves, as shown and described.

HENRY B. SHERWOOD.

Witnesses:
MOSES W. WILSON,
MARGARET E. WILSON.